(12) United States Patent
Hamakawa

(10) Patent No.: US 10,031,707 B2
(45) Date of Patent: Jul. 24, 2018

(54) COMMUNICATION SYSTEM AND COMMUNICATION METHOD FOR LINKING IMAGE FORMING DEVICE WITH PORTABLE TERMINAL USING SHORT-RANGE WIRELESS COMMUNICATION

(71) Applicant: KYOCERA Document Solutions Inc., Osaka (JP)

(72) Inventor: Takeshi Hamakawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 16 days.

(21) Appl. No.: 15/502,958

(22) PCT Filed: Dec. 14, 2015

(86) PCT No.: PCT/JP2015/084948
§ 371 (c)(1),
(2) Date: Feb. 9, 2017

(87) PCT Pub. No.: WO2016/139865
PCT Pub. Date: Sep. 9, 2016

(65) Prior Publication Data
US 2017/0228204 A1    Aug. 10, 2017

(30) Foreign Application Priority Data
Mar. 2, 2015    (JP) .................. 2015-039755

(51) Int. Cl.
*G06F 3/12* (2006.01)
*H04W 12/06* (2009.01)
*H04W 76/00* (2018.01)
*H04N 1/00* (2006.01)
*G06K 7/10* (2006.01)

(52) U.S. Cl.
CPC .......... *G06F 3/1238* (2013.01); *G06F 3/1203* (2013.01); *G06F 3/1222* (2013.01);
(Continued)

(58) Field of Classification Search
CPC .... G06F 3/1203; G06F 3/1238; G06F 3/1239; G06F 3/1222; G06F 3/1236;
(Continued)

(56) References Cited

U.S. PATENT DOCUMENTS

2005/0238046 A1* 10/2005 Hassan ............... H04L 12/5692
370/465
2010/0062753 A1* 3/2010 Wen .................. H04M 1/27455
455/418

(Continued)

FOREIGN PATENT DOCUMENTS

JP    2013-214806 A    10/2013

*Primary Examiner* — Benny Q Tieu
*Assistant Examiner* — Juan M Guillermety
(74) *Attorney, Agent, or Firm* — Stein IP, LLC

(57) ABSTRACT

The present invention improves user experience when a reader/writer (5) and a portable terminal (7) engage in near field communication by selecting any of two or more communication modes in order to link an image forming device (3) and the portable terminal (7) using near field communication. When a log-in screen is displayed on a display unit (403) of the image forming device (3), the reader/writer (5) and the portable terminal (7) are automatically set to a read communication mode.

3 Claims, 6 Drawing Sheets

(52) U.S. Cl.
CPC .......... *G06F 3/1236* (2013.01); *G06F 3/1288* (2013.01); *G06F 3/1292* (2013.01); *G06K 7/10297* (2013.01); *H04N 1/00244* (2013.01); *H04N 1/00342* (2013.01); *H04N 1/00411* (2013.01); *H04N 2201/006* (2013.01); *H04N 2201/0039* (2013.01); *H04N 2201/0041* (2013.01); *H04N 2201/0094* (2013.01)

(58) Field of Classification Search
CPC .... G06F 3/1288; G06F 3/1285; G06F 3/1292; G06F 3/1287; H04N 1/00411; H04N 1/00244; H04N 1/00342; H04N 1/0094; H04N 2201/006; G06K 7/10297; G06K 7/10237; G06K 7/10247
USPC ........................................................ 358/1.15
See application file for complete search history.

(56) References Cited

U.S. PATENT DOCUMENTS

| | | | |
|---|---|---|---|
| 2013/0258381 A1 | 10/2013 | Sato | 358/1.13 |
| 2014/0268222 A1* | 9/2014 | Inoue | G06F 3/1236 358/1.15 |
| 2014/0342665 A1* | 11/2014 | Amano | H04W 8/005 455/41.1 |
| 2015/0350905 A1* | 12/2015 | Suzuki | H04W 4/008 726/7 |
| 2015/0382135 A1* | 12/2015 | Kawahara | H04W 4/008 455/41.1 |
| 2016/0062572 A1* | 3/2016 | Yang | H04W 4/008 715/835 |
| 2016/0080591 A1* | 3/2016 | Asakura | H04W 4/008 358/1.15 |
| 2016/0360346 A1* | 12/2016 | Nagata | H04W 4/008 |

* cited by examiner

COMMUNICATION SYSTEM AND COMMUNICATION METHOD FOR LINKING IMAGE FORMING DEVICE WITH PORTABLE TERMINAL USING SHORT-RANGE WIRELESS COMMUNICATION

CROSS-REFERENCE TO RELATED APPLICATIONS

This application claims the benefit of International Application No. PCT/JP2015/084948, filed Dec. 14, 2015, which claims priority to Japanese Application No. 2015-039755, filed Mar. 2, 2015, in the Japanese Property Office, the disclosures of which are incorporated herein in their entireties by reference.

TECHNICAL FIELD

The present invention relates to an art of linking an image forming device and a portable terminal with each other using short-range wireless communication.

BACKGROUND ART

An example of short-range wireless communication is near field communication (NFC). NFC has three communication modes, namely, card emulation mode, reader/writer mode, and inter-device communication (peer-to-peer) mode.

The card emulation mode is a communication mode in which a portable terminal is used as a contactless IC card or a contactless IC tag. When a portable terminal is held over a reader/writer, the reader/writer reads card information or tag information stored in the portable terminal.

The reader/writer mode is a communication mode in which a portable terminal is used as a reader/writer. When a portable terminal is held over a contactless IC card or a contactless IC tag, the portable terminal reads information stored in the contactless IC card or the contactless IC tag.

The peer-to-peer mode is a communication mode in which two devices perform two-way communication with each other to exchange data therebetween. When two devices (such as two portable terminals) are held close to each other, the two devices exchange data (of address books, for example) with each other.

For example, Patent Literature 1 listed below discloses an art of using NFC to link an image forming device and a portable terminal with each other.

CITATION LIST

Patent Literature

Patent Literature 1: Japanese Patent Application Publication No. 2013-214806

SUMMARY OF INVENTION

Technical Problem

To log in to an image forming device by using a portable terminal as a contactless IC card or a contactless IC tag, it is necessary to set the communication mode of the portable terminal to the card emulation mode. On the other hand, for the portable terminal and the image forming device to exchange data with each other (for example, for the portable terminal to receive an address book stored in the image forming device), it is necessary to set the communication mode of the portable terminal to the peer-to-peer mode.

To a user, it is troublesome to operate the portable terminal to set the communication mode while simultaneously operating the image forming device.

An object of the present invention is to provide a communication system capable of improving user friendliness of short-range wireless communication between a reader/writer and a portable terminal performed by selecting any of two or more communication modes to link the portable terminal to an image forming device, and further, to provide a communication method and an image forming device applied to such a system.

Solution to Problem

According to a first aspect of the present invention made to achieve the above object, a communication system includes an image forming device, a reader/writer, and a portable terminal, the reader/writer and the portable terminal performing short-range wireless communication with each other by selecting any of a plurality of communication modes. Here, the image forming device includes a display unit, a first communication unit used for communication with the reader/writer, and a first communication control unit which, when a screen associated with any of the plurality of communication modes is displayed on the display unit, makes the first communication unit transmit communication mode information indicating a communication mode associated with the screen, the reader/writer includes a second communication unit used for communication with the image forming device, a third communication unit used for communication with the portable terminal, a first mode-set unit which is set to any of the plurality of communication modes, and a second communication control unit which performs control such that the reader/writer communicates with the portable terminal by using the third communication unit, in a communication mode to which the first mode-set unit has been set, and which, when the second communication unit has received the communication mode information, makes the third communication unit transmit a request for communication in the communication mode associated with the screen and sets the first mode-set unit to the communication mode associated with the screen, and the portable terminal includes a fourth communication unit used for communication with the reader/writer, a second mode-set unit which is set to any of the plurality of communication modes, and a third communication control unit which performs control such that the portable terminal communicates with the reader/writer by using the fourth communication unit, in the communication mode to which the second mode-set unit has been set, and which, when the fourth communication unit has received the request, sets the second mode-set unit to the communication mode associated with the screen and performs control such that the portable terminal communicates with the image forming device via the reader/writer.

With the communication system according to the first aspect of the present invention, when a screen associated with any of the plurality of communication modes is displayed on the display unit of the image forming device, the portable terminal can be automatically set to the communication mode associated with the screen. This makes it possible to omit the operation of setting the communication mode of the portable terminal, and thus helps achieve improved user friendliness.

According to a second aspect of the present invention, a communication method is one that is applied to a communication system which includes an image forming device, a reader/writer, and a portable terminal, and in which the reader/writer and the portable terminal perform short-range wireless communication with each other by selecting any of a plurality of communication modes. The communication method includes displaying a screen associated with any of the plurality of communication modes on a display unit of the image forming device and making the image forming device transmit communication mode information indicating a communication mode associated with the screen to the reader/writer, making the reader/writer, which has received the communication mode information, transmit to the portable terminal a request for communication in the communication mode associated with the screen, setting the portable terminal, which has received the request, to the communication mode associated with the screen, and making the portable terminal and the image forming device communicate with each other in the communication mode.

With the communication method according to the second aspect of the present invention, it is possible, when a screen associated with any of the plurality of communication modes is displayed on the display unit of the image forming device, to automatically set the portable terminal to the communication mode associated with the screen to make the portable terminal and the image forming device communicate with each other. This makes it possible to omit the operation of setting the communication mode of the portable terminal, and thus helps achieve improved user friendliness.

According to a third aspect of the present invention, an image forming device is applied to a communication system in which a reader/writer and a portable terminal perform short-range wireless communication with each other by selecting any of a plurality of communication modes, and the image forming device includes a display unit, a first communication unit used for communication with the reader/writer, and a first communication control unit which, when a screen associated with any of the plurality of communication modes is displayed on the display unit, makes the first communication unit transmit communication mode information indicating a communication mode associated with the screen.

The image forming device according to the third aspect of the present invention is applicable to the communication system according to the first aspect of the present invention.

Advantageous Effects of Invention

According to the present invention, it is possible to improve user friendliness of short-range wireless communication between a reader/writer and a portable terminal performed by selecting any of two or more communication modes to link the portable terminal to an image forming device.

DESCRIPTION OF EMBODIMENTS

Figure 1:
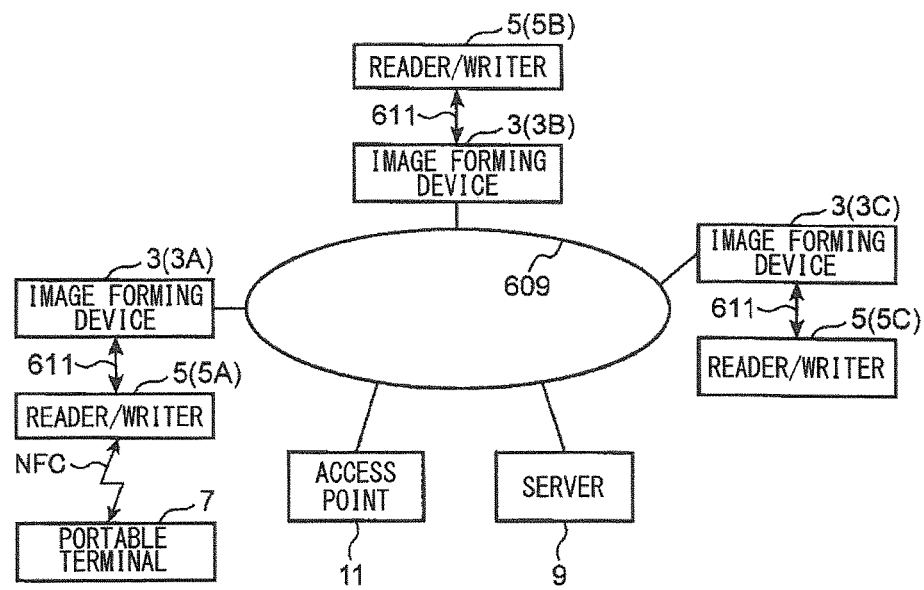
FIG. 1 is a block diagram illustrating a configuration of a communication system according to the present embodiment.

Hereinafter, embodiments of the present invention will be described in detail with reference to the accompanying drawings. FIG. 1 is a block diagram illustrating a configuration of a communication system 1 according to an embodiment of the present invention. The communication system 1 includes an image forming device 3, a reader/writer 5, a portable terminal 7, a server 9, and an access point 11.

The image forming device 3 is connected to a wired LAN 609, which is an example of network. FIG. 1 illustrates a plurality of image forming devices 3A, 3B, and 3C connected to the LAN 609. When there is no need of making distinction between them, they will be simply referred to as the image forming device 3. Although three image forming devices are included as the image forming device 3 here, one image forming device or a plurality of image forming devices need to be included as the image forming device 3, and thus the number of image forming devices to be included as the image forming device 3 is not limited to three.

The reader/writer 5 is a device which uses short-range wireless communication of NFC to read information from a contactless IC card or a contactless IC tag, and writes information onto a contactless IC card or a contactless IC tag.

The portable terminal 7, which is also referred to as a mobile terminal, is a portable device, such as a cell phone, a smart phone, a tablet terminal, or a notebook personal computer. The portable terminal 7 and the reader/writer 5 are able to perform shot-range wireless communication by using the NFC method.

Modes of this communication include read communication mode and two-way communication mode. The read communication mode is what is called the card emulation mode, and is a communication mode in which the portable terminal 7 is used as a contactless IC card or a contactless IC tag, and the reader/writer 5 reads card information or tag information stored in a storage unit 79 (FIG. 4) of the portable terminal 7. Hereinafter, "contactless IC card or a contactless IC tag" will be simply referred to as "contactless IC card", and "card information or tag information" will be simply referred to as "card information".

The two-way communication mode is what is called a peer-to-peer mode, which is a communication mode in which two-way communication is performed between two devices (here, between the portable terminal 7 and the reader/writer 5) for data exchange between the two devices. The portable terminal 7 and the reader/writer 5 perform the short-range wireless communication by using the NFC method, by selecting any of a plurality of communication modes (the read communication mode, the two-way communication mode). Here, the NFC method will be described as an example, but this does not mean to exclude other types of short-range wireless communication.

The server 9 and the access point 11 are connected to LAN 609.

The wireless communication between the access point 11 and the portable terminal 7 is wireless LAN communication, for example. The access point 11 connects the portable terminal 7 and the LAN 609 to each other. Printing data transmitted from the portable terminal 7 via the wireless communication (that is, printing data indicating an image to be printed using the image forming device 3) is sent via the access point 11 to the image forming device 3.

The server 9 manages information of each of the plurality of the image forming devices 3 connected to the LAN 609 (for example, the latest version of firmware for each image forming device 3).

Figure 2:
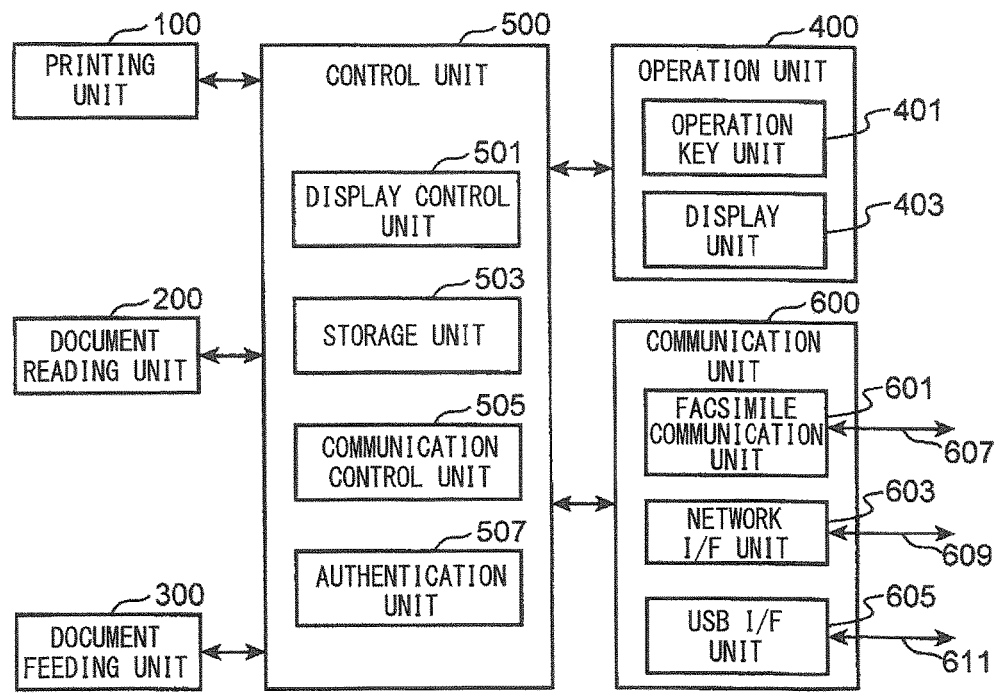
FIG. 2 is a block diagram illustrating a configuration of an image forming device illustrated in FIG. 1.

FIG. 2 is a block diagram illustrating a configuration of the image forming device 3 illustrated in FIG. 1. A description will be given taking a digital multifunction peripheral, which has copier, printer, scanner, and facsimile, functions as an example of the image forming device 3. The image forming device 3 needs to be a device equipped with a function of printing images, but is not limited to a digital multifunction peripheral. For example, the image forming device 3 may be a printer. The image forming device 3 includes a printing unit 100, a document reading unit 200, a document feeding unit 300, an operation unit 400, a control unit 500, and a communication unit 600.

The document feeding unit 300 is operable in such a manner that when a sheet of document is placed on a document placing portion provided in the document feeding unit 300, the document feeding unit 300 sends the document to the document reading unit 200, whereas when a plurality of sheets of documents are placed on the document placing portion, the document feeding unit 300 sends the plurality of sheets of documents to the document reading unit 200 one after another.

The document reading unit 200 reads a document placed on a document table or reads a document fed from the document feeding unit 300, and outputs image data of the read document.

The printing unit 100 executes a printing job. The printing job is a job of producing a printed matter on which is printed an image indicated by data (for example, printing data transmitted from the portable terminal 7, image data outputted from the document reading unit 200, and image data received via facsimile).

The operation unit 400 includes an operation key unit 401 and a display unit 403. The display unit 403 has a touch panel function, and displays a screen including software keys. With the screen displayed, a user operates the software keys to thereby input various settings and the like necessary for execution of a function such as the copy function.

The operation key unit 401 is provided with hardware keys as operation keys. The operation keys are, for example, a start key, a numeric keypad, a reset key, and a function switching key for switching between copy, printer, scanner, and facsimile functions.

The control unit 500 includes a CPU, an ROM, an RAM, and the like. The CPU executes control necessary to make the image forming device 3 operate, with respect to the above components (such as the printing unit 100) of the image forming device 3. The ROM stores therein software necessary to control the operation of the image forming device 3. The RAM is used for temporary storage of data produced by execution of the software, and for storage of application software, for example.

The control unit 500 includes a display control unit 501, a storage unit 503, a communication control unit 505 and an authentication unit 507 as function blocks. Detailed descriptions of these blocks will be given later.

The communication unit 600 includes a facsimile communication unit 601, a network I/F unit 603, and a USB I/F unit 605. The facsimile communication unit 601 includes a network control unit (NCU) which controls connection via a telephone line with a destination facsimile machine and a modulation/demodulation circuit which modulates and demodulates facsimile communication signals. The facsimile communication unit 601 is connected to a telephone line 607.

The network I/F unit 603 is connected to the LAN 609. The network I/F unit 603 is a communication interface circuit for executing communication between devices (the server 9, the access point 11, an unillustrated personal computer, and the like) connected to the LAN 609.

The USB I/F unit 605 is a communication interface circuit for executing communication via a USB cable 611 between the image forming device 3 and the reader/writer 5. The USB I/F unit 605 functions as a first communication unit used for communication with the reader/writer 5.

The display control unit 501 performs control to make the display unit 403 display a screen. Examples of the screen displayed on the display unit 403 include a log-in screen, a device state screen, a network setting screen, a firmware version screen, and a copy setting screen. The log-in screen is a screen displayed on the display unit 403 when the authentication unit 507 performs authentication of a use of the image forming device 3. The device state screen is a screen indicating states (regarding the amount of remaining toner, the number of remaining sheets, and maintenance time, for example) of the image forming device 3. The network setting screen is a screen indicating information set in the image forming device 3 when the image forming device 3 is connected to the LAN 609 (for example, an IP address assigned to the image forming device 3 and the like). The firmware version screen is a screen indicating version information of the firmware of the image forming device 3. The copy setting screen is a screen for inputting settings regarding scaling, sheet size, copy density, and the like, which are necessary for copying.

The storage unit 503 stores therein information that is sent from the image forming device 3 to the portable terminal 7 through two-way communication performed between the portable terminal 7 and the reader/writer 5 (for example, information included in the device state screen, the network setting screen, the firmware version screen, and the copy setting screen). As for the device state screen, for example, the storage unit stores therein information indicating the state (regarding the amount of remaining toner, the number of remaining sheets, time for maintenance, for example) of the image forming device 3.

The communication control unit 505 functions as a first communication control unit, and when a screen associated with any of the plurality of communication modes (namely, the read communication mode and the two-way communication mode in the present embodiment) is displayed on the display unit 403, the communication control unit 505 makes the network I/F unit 603 transmit communication mode information indicating the communication mode associated with the screen.

The communication control unit 505 stores therein, in advance, information indicating this relationship with respect to a screen of all the screens displayed on the display unit 403 that is associated with any of the plurality of communication modes. The communication control unit 505 stores therein, for example, information to the effect that the read communication mode is associated with the log-in screen, and information to the effect that the two-way communication mode is associated with the device state screen, the network selling screen, the firmware version screen, and the copy setting screen.

The authentication unit 507 performs authentication of the user of the image forming device 3, in which the authentication unit 507 is incorporated, and when the user is successfully authenticated, the authentication unit 507 permits the user to use the image forming device 3, whereas when the user fails to be authenticated, the authentication unit 507 does not permit the user to use the image forming device 3. The user authentication in the present embodiment is authentication of an IC card performed by using card information stored in the IC card. The card information includes user information which identifies the user.

Figure 3:
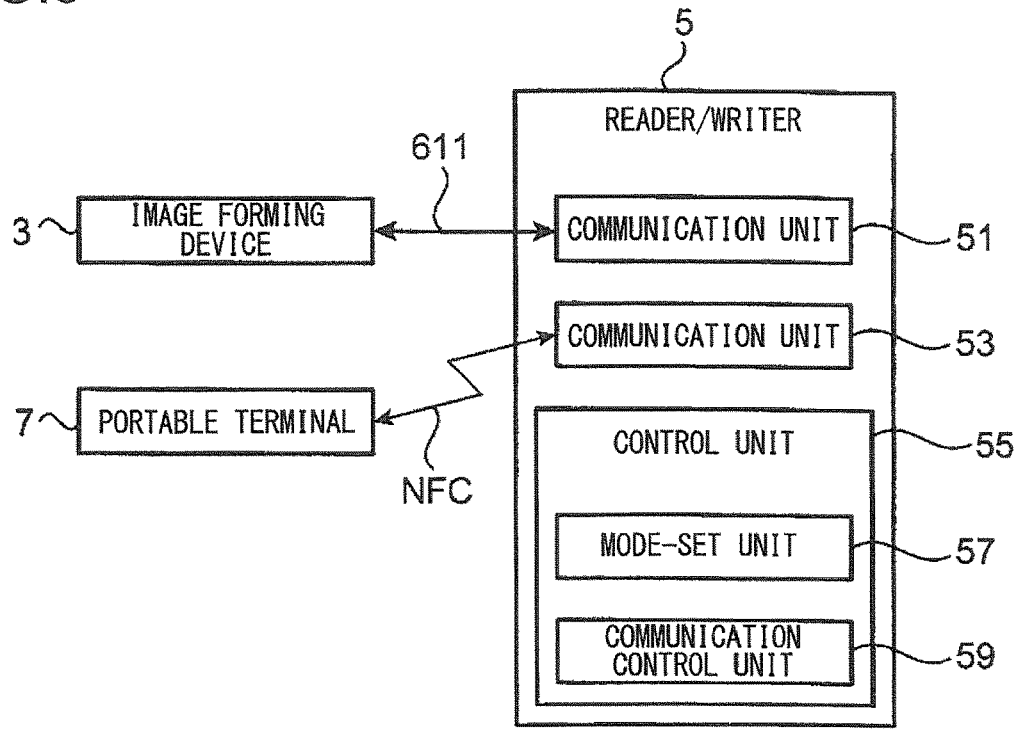
FIG. 3 is a block diagram illustrating a configuration of a reader/writer illustrated in FIG. 1.

FIG. 3 is a block diagram illustrating a configuration of the reader/writer 5, which is illustrated in FIG. 1. The reader/writer 5 includes a communication unit 51, a communication unit 53, and a control unit 55.

The communication unit 51 is a communication interface circuit for executing communication between the reader/writer 5 and the image forming device 3 via the USB cable 611. The communication unit 51 functions as a second communication unit used for communication with the image forming device 3.

The communication unit 53 is a communication interface circuit for executing short-range wireless communication by using the NFC method between the reader/writer 5 and the portable terminal 7. The communication unit 53 functions as a third communication unit used for communication with the portable terminal 7.

The control unit 55 includes, a CPU, an ROM, an RAM, and the like. The CPU executes control necessary to make the reader/writer 5 operate, with respect to the communication units 51 and 53. The ROM stores therein software necessary to control the operation of the reader/writer 5. The RAM is used for temporary storage of data produced by execution of the software, and for storage of application software, for example.

The control unit 55 includes a mode-set unit 57 and a communication control unit 59 as function blocks.

The mode-set unit 57 is set to either the read communication mode or the two-way communication mode. The mode-set unit 57 functions as a first mode-set unit which is set to any of the plurality of communication modes.

The communication control unit 59 functions as a second communication control unit; the communication control unit 59 performs control such that the reader/writer 5 communicates with the portable terminal 7 by using the communication unit 53, in the communication mode to which the mode-set unit 57 has been set, and when the communication unit 51 has received communication mode information, the communication control unit 59 makes the communication unit 53 transmit a request for communication in the communication mode associated with a screen and sets the mode-set unit 57 to the communication mode associated with the screen.

Figure 4:
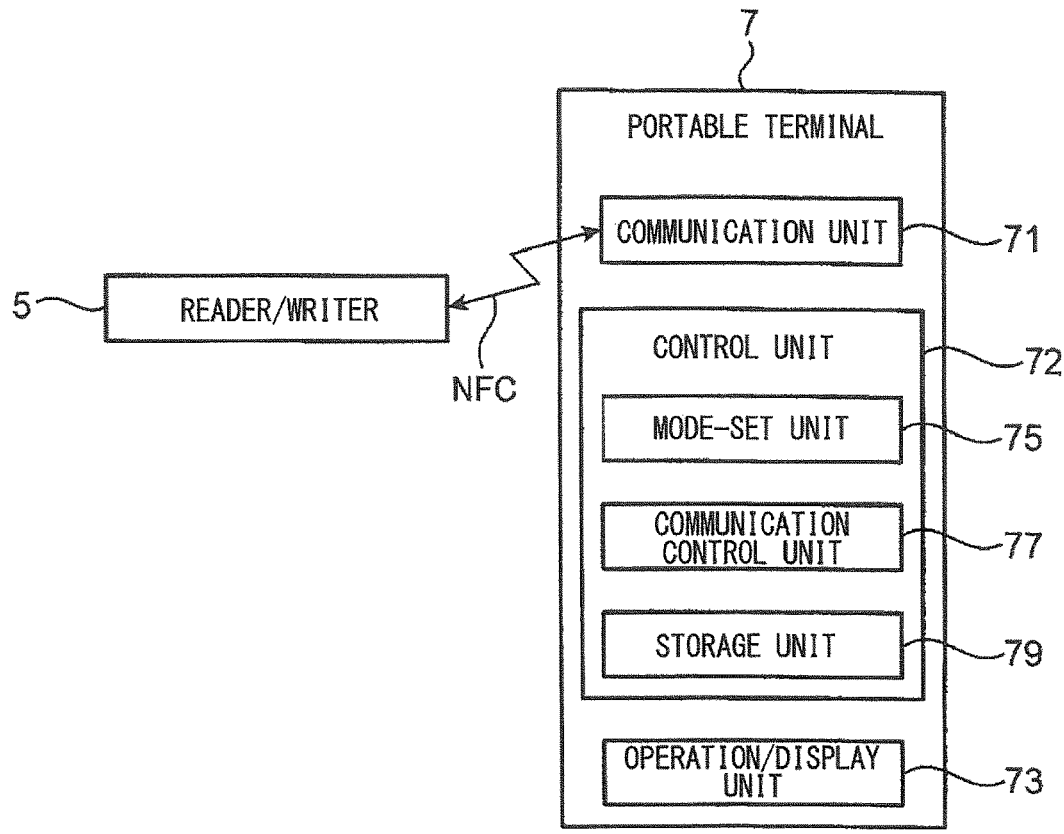
FIG. 4 is a block diagram illustrating a configuration of a portable terminal illustrated in FIG. 1.

FIG. 4 is a block diagram illustrating a configuration of the portable terminal 7 illustrated in FIG. 1. The portable terminal 7 includes a communication unit 71, a control unit 72, and an operation/display unit 73.

The communication unit 71 is a communication interface circuit which executes wireless communication, and includes a communication interface function for executing short-range wireless communication between the portable terminal 7 and the reader/writer 5 by using the NFC method. The communication unit 71 functions as a fourth communication unit used for communication with the reader/writer 5.

The control unit 72 includes a CPU, an ROM, an RAM, and the like. The control unit 72 executes control to operate the portable terminal 7. The control unit 72 includes a mode-set unit 75, a communication control unit 77, and a storage unit 79 as function blocks.

The mode-set unit 75 is set to either the read communication mode or the two-way communication mode. The mode-set unit 75 functions as a second mode-set unit which is set to any of the plurality of communication modes.

The communication control unit 77 functions as a third communication control unit; the communication control unit 77 performs control such that the portable terminal 7 communicates with the reader/writer 5 by using the communication unit 71, in the communication mode to which the mode-set unit 75 has been set, and when the communication unit 71 has received a request, the communication control unit 77 sets the mode-set unit 75 to a communication mode associated with a screen and performs control such that the portable terminal 7 communicates with the image forming device 3 via the reader/writer 5.

The storage unit 79 stores therein NFC card information (which may be referred to also as NFC tag information). The NFC card information includes user information (such as user ID) to be used for the user authentication.

The operation/display unit 73 is a touch panel type user interface, and includes a display unit such as a liquid crystal display panel. On the operation/display unit 73, various operations are performed to make the portable terminal 7 operate.

Included in examples of operation of the communication system 1 according to the present embodiment are a first example and a second example described below. The following are two preconditions for the first and second examples.

As illustrated in FIG. 2, when power starts to be supplied to the image forming device 3 to activate the systems in the image forming device 3, the communication control unit 505 makes the USB I/F unit 605 transmit a signal instructing initialization. As illustrated in FIG. 3, the signal is received by the communication unit 51 of the reader/writer 5 via the USB cable 611, and the communication control unit 59 initializes the reader/writer 5.

As illustrated in FIG. 4, the user operates the operation/display unit 73 of the portable terminal 7 to set the portable terminal 7 to a mode for using NFC.

Figure 5:
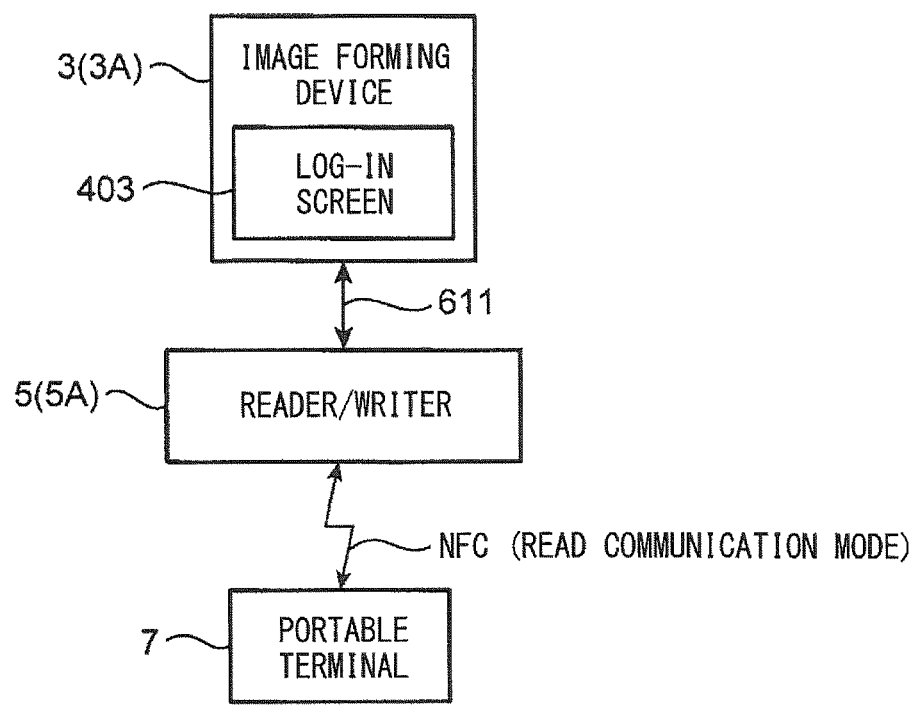
FIG. 5 is an explanatory diagram illustrating a relationship between the image forming device, the reader/writer, and the portable terminal in a first example of operation of the communication system according to the present embodiment.
Figure 6:
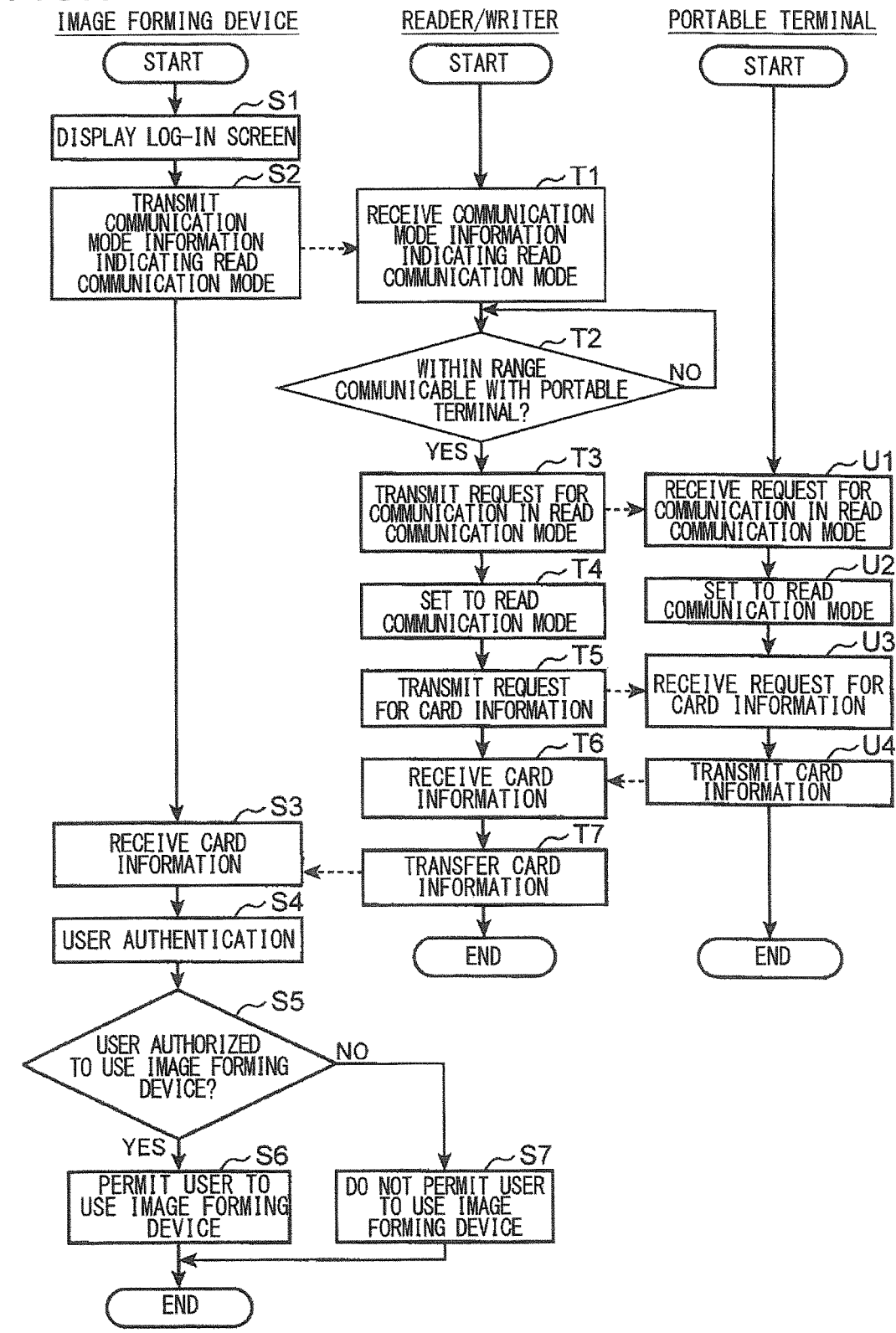
FIG. 6 is a flowchart illustrating the first example.

A description will now be given of the first example of operation of the communication system 1 according to the present embodiment. FIG. 5 is an explanatory diagram illustrating a relationship between the image forming device 3, the reader/writer 5, and the portable terminal 7 in the first example. In the first example, when the log-in screen is displayed on the display unit 403 of the image forming device 3, the reader/writer 5 and the portable terminal 7 are automatically set to the read communication mode. FIG. 6 is a flowchart for illustrating the first example.

As illustrated in FIG. 2 and FIG. 6, when the user operates the operation unit 400 of the image forming device 3 to input an instruction to display the log-in screen, the display control unit 501 makes the display unit 403 display the log-in screen (Step S1).

Since the communication control unit 505 stores therein the log-in screen and the read communication mode in association with each other, the communication control unit 505 makes the USB I/F unit 605 transmit communication mode information indicating the read communication mode (Step S2).

As illustrated in FIG. 3 and FIG. 6, the communication unit 51 of the reader/writer 5 receives the communication mode information transmitted in Step S2 (Step T1).

The communication control unit 59 makes a judgment on whether the portable terminal 7 exists within a range where communication in NFC is possible with the reader/writer 5 (Step T2). When it is found that the portable terminal 7 does not exist within the range where communication with the reader/writer 5 in NFC is possible (No in Step T2), the communication control unit 59 repeats the processing of Step T2.

When the portable terminal 7 is found to exist within the range where communication with the reader/writer 5 in NFC is possible (Yes in Step T2), the communication control unit 59 makes the communication unit 53 transmit a request for communication in the read communication mode (Step T3), and sets the mode-set unit 57 to the read communication mode (Step T4).

As illustrated in FIG. 4 and FIG. 6, when the portable terminal 7 exists within the range where communication with the reader/writer 5 in NFC is possible, the communication unit 71 receives the request transmitted in Step T3 (Step U1). Then, the communication control unit 77 sets the mode-set unit 75 to the read communication mode (Step U2), and from then on, the communication control unit 77 performs control such that the portable terminal 7 communicates with the image forming device 3 via the reader/writer 5.

After Step T4 and Step U2, the reader/writer 5 and the portable terminal 7 communicate with each other in the read communication mode, and the reader/writer 5 receives card information from the portable terminal 7 (Step T5, Step T6, Step U3, Step U4). To be more in detail, as illustrated in FIG. 3 and FIG. 6, the communication control unit 59 of the reader/writer 5 makes the communication unit 53 transmit a request for the card information (Step T5).

As illustrated in FIG. 4 and FIG. 6, the communication unit 71 of the portable terminal 7 receives the request transmitted in Step T5 (Step U3). The communication control unit 77 reads the card information stored in the storage unit 79, and makes the communication unit 71 transmit the card information (Step U4).

As illustrated in FIG. 3 and FIG. 6, the communication unit 53 of the reader/writer 5 receives the card information transmitted in Step U4 (Step T6).

The communication control unit 59 makes the communication unit 51 transfer the card information, which has been received by the communication unit 53 in Step T6 (Step T7).

As illustrated in FIG. 2 and FIG. 6, the USB I/F unit 605 of the image forming device 3 receives the card information, which has been transferred in Step T7 (Step S3).

The authentication unit 507 performs user authentication by using the card information, which has been received in Step S3 (Step S4).

The authentication unit 507 makes a judgment on whether the user is authorized to use the image forming device 3, based on a result of the user authentication (Step S5). When the user identified by the card information is found to be authorized to use the image forming device 3 (Yes in Step S5: user authentication succeeded), the authentication unit 507 permits the user to use the image forming device 3 (Step S6).

When the user identified by the card information is found not to be authorized to use the image forming device 3 (No in step S5: user authentication failed), the authentication unit 507 does not permit the user to use the image forming device 3 (Step S7).

Figure 7:
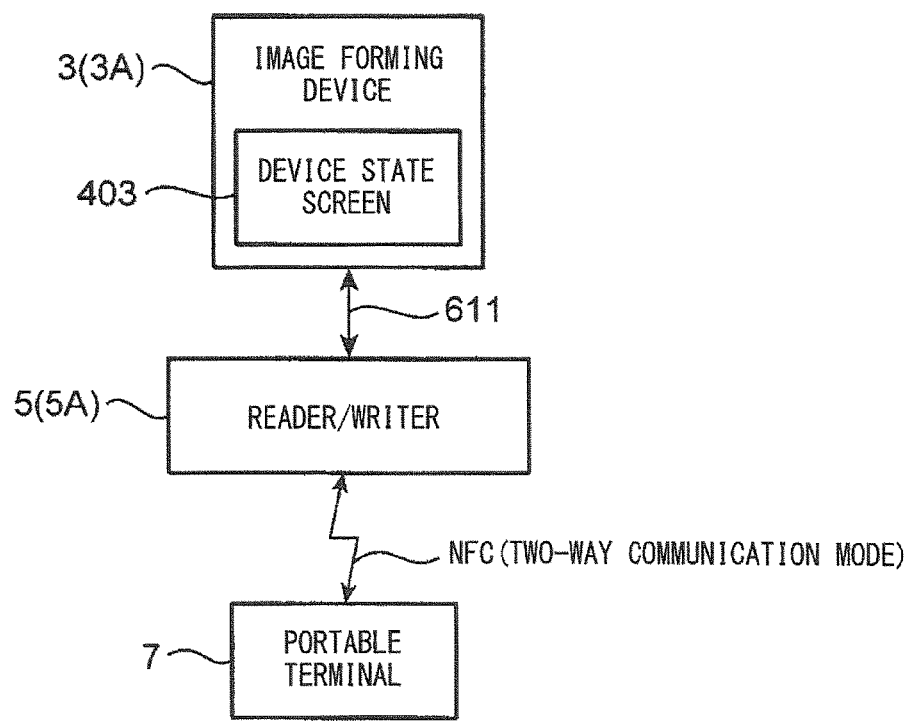
FIG. 7 is an explanatory diagram illustrating a relationship between the image forming device, the reader/writer, and the portable terminal in a second example of operation of the communication system according to the present embodiment.
Figure 8:
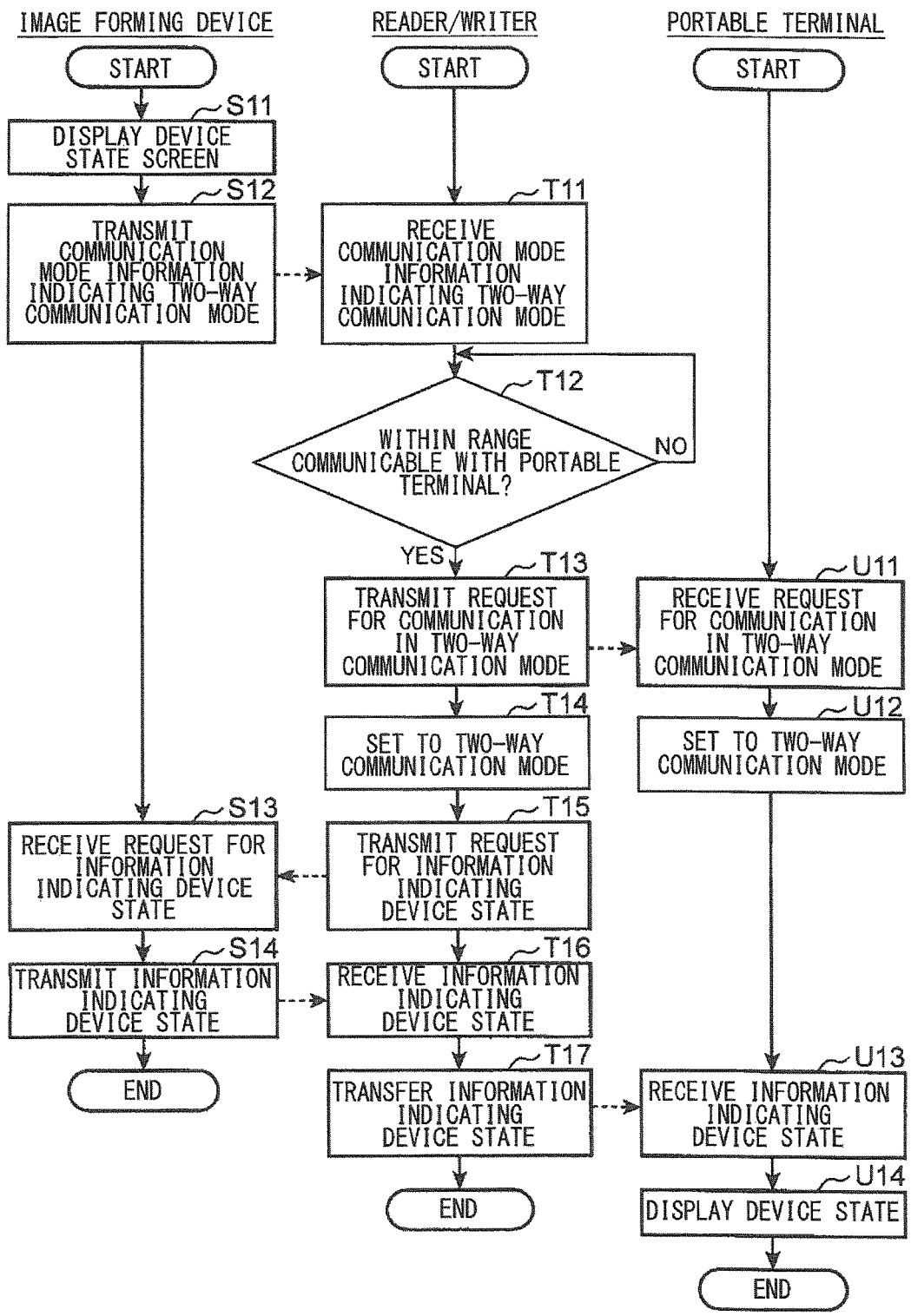
FIG. 8 is a flowchart illustrating the second example.

Next, a description will be given of the second example of operation of the communication system 1 according to the present embodiment. FIG. 7 is an explanatory diagram illustrating a relationship between the image forming device 3, the reader/writer 5, and the portable terminal 7 in the second example. The description of the second example will be given taking the device state screen as an example of a screen associated with the two-way communication mode. When the device state screen is displayed on the display unit 403 of the image forming device 3, the reader/writer 5 and the portable terminal 7 are automatically set to the two-way communication mode. FIG. 8 is a flowchart for illustrating the second example.

As illustrated in FIG. 2 and FIG. 8, when the user operates the operation unit 400 of the image forming device 3 to input an instruction to display the device state screen, the display control unit 501 makes the display unit 403 display the device state screen (Step S11).

Since the communication control unit 505 stores therein the device state screen and the two-way communication mode in association with each other, the communication control unit 505 makes the USB I/F unit 605 transmit information indicating the two-way communication mode (Step S12).

As illustrated in FIG. 3 and FIG. 8, the communication unit 51 of the reader/writer 5 receives the communication mode information, which has been transmitted in Step S12 (Step T11).

The communication control unit 59 makes a judgment on whether the portable terminal 7 exists within a range where communication in NFC is possible with the reader/writer 5 (Step T12). When it is found that the portable terminal 7 does not exist within the range where communication with the reader/writer 5 in NFC is possible (No in Step T12), the communication control unit 59 repeats the processing of Step T12.

When the portable terminal 7 is found to exist within the range where communication with the reader/writer 5 in NFC is possible (Yes in Step T12), the communication control unit 59 makes the communication unit 53 transmit a request for communication in the two-way communication mode (Step T13), and sets the mode-set unit 57 to the two-way communication mode (Step T14).

As illustrated in FIG. 4 and FIG. 8, when the portable terminal 7 exists within the range where communication with the reader/writer 5 in NFC is possible, the communication unit 71 receives the request, which has been transmitted in Step T13 (Step U11). Then, the communication control unit 77 sets the mode-set unit 75 to the two-way communication mode (Step U12), and from then on, the communication control unit 77 performs control such that the portable terminal 7 communicates with the image forming device 3 via the reader/writer 5.

To be more in detail, as illustrated FIG. 3 and FIG. 8, after Step T14, the communication control unit 59 of the reader/writer 5 makes the communication unit 51 transmit a request for information indicating the device state (Step T15).

As illustrated in FIG. 2 and FIG. 8, the USB I/F unit 605 of the image forming device 3 receives the request, which has been transmitted in Step T15 (Step S13). Then, the communication control unit 505 reads the information indicating the device state stored in the storage unit 503, and makes the USB I/F unit 605 transmit the information indicating the device state and predetermined activation information (Step S14). The activation information here is information for activating an application for making the operation/display unit 73 of the portable terminal 7 illustrated in FIG. 4 display the information indicating the device state. The storage unit 79 of the portable terminal 7 stores the application therein.

As illustrated in FIG. 3 and FIG. 8, the communication unit 51 of the reader/writer 5 receives the information indicating the device state and the predetermined activation information, which have been transmitted in Step S14 (Step T16).

The communication control unit 59 makes the communication unit 53 transfer the information indicating the device state and the predetermined activation information, which have been received by the communication unit 51 in Step T16 (Step T17).

As illustrated in FIG. 4 and FIG. 8, the communication unit 71 of the portable terminal 7 receives the information indicating the device state and the predetermined activation information, which have been transferred in Step T17 (Step U13). In Step U13 and Step T17, the reader/writer 5 and the portable terminal 7 communicate with each other in the two-way communication mode.

The control unit 72 of the portable terminal 7 uses the predetermined activation information, which has been received by the communication unit 71 in Step U13, to activate the application for making the operation/display unit 73 display the information indicating the device state, and makes the operation/display unit 73 display the information indicating the device state, which has been received by the communication unit 71 in Step U13 (Step U14).

The information indicating the device state, which is displayed on the operation/display unit 73, includes alert information (for example, information to the effect that the remainder of toner is equal to or less than a previously set threshold). In a case where, in the image forming device 3, the device state screen displayed on the display unit 403 is set not to include any alert information, the user is able to know alert information through the information indicating the device state, which is displayed on the operation/display unit 73.

When the screen displayed on the display unit 403 of the image forming device 3 is the network setting screen, what is displayed on the operation/display unit 73 is a screen indicating information (the IP address assigned to the image forming device 3, for example) set in the image forming device 3 when the image forming device 3 is connected to the LAN 609. Based on the information, the communication control unit 77 controls the communication unit 71, and checks whether network connection is possible with the image forming device 3 via the access point 11 and the LAN 609 illustrated in FIG. 1.

When the screen displayed on the display unit 403 is the firmware version screen, what is displayed on the operation/display unit 73 is a list of version information of the firmware of the image forming device 3. The communication control unit 77 controls the communication unit 71, accesses the server 9 via the access point 11 and the LAN 609 illustrated in FIG. 1, and obtains information of the latest version of firmware of the image forming device 3. When the control unit 72 of the portable terminal 7 finds that the firmware of the image forming device 3 is not of the latest version and thus needs an update, the control unit 72 provides a display to that effect on the operation/display unit 73.

When the screen displayed on the display unit 403 is the copy setting screen, various values set on the screen (such as the scaling, the sheet size, the copy density, and the like) are displayed on the operation/display unit 73. Next time the user uses the image forming device 3, he or she can set these values on the image forming device 3 by sending them to the image forming device 3 from the portable terminal 7 via the reader/writer 5 by using the short-range wireless communication of the NFC method.

In Step U1 illustrated in FIG. 6 and Step U11 illustrated in FIG. 8, when the portable terminal 7 has received a request, if the control unit 72 of the portable terminal 7 finds that the image forming device 3, which performs communication via the reader/writer 5, has not been registered in a device list stored in the storage unit 79 of the portable terminal 7, the control unit 72 registers, in the device list, information regarding the image forming device 3 (such as the IP address of the image forming device 3 and the name given to the image forming device 3). And, if the communication control unit 77 of the portable terminal 7 finds that the image forming device 3 and the portable terminal 7 are not set for network communication performed by using the access point 11 and the LAN 609, the communication control unit 77 controls the communication unit 71 such that the communication unit 71 transmits, by using the short-range wireless communication of the NFC method (in other words, via the reader/writer 5), a request to make settings necessary for the network communication in the image forming device 3. When this request is received by the USB I/F unit 605 of the image forming device 3 illustrated in FIG. 2, the communication control unit 505 makes the settings necessary for the network communication with the portable terminal 7.

The network connection between the portable terminal 7 and the image forming device 3 makes it possible for them to exchange information and data with each other by using the network (the access point 11 and the LAN 609). If some defect (such as disconnection of a LAN cable from the image forming device 3) prevents the portable terminal 7 and the image forming device 3 from exchanging information or data with each other by using the network, as for information and data of a small quantity (such as information indicating the state of the image forming device 3 and the information of the version of the firmware of the image forming device 3), the portable terminal 7 and the image forming device 3 can exchange such information and data with each other by using the short-range wireless communication of the NFC method.

The portable terminal 7 holds the latest information and data related to the image forming device 3 by the regular exchange of information and data via the server 9 and the network (the access point 11 and the LAN 609).

Main effects of the present embodiment will now be described. As has been discussed in the descriptions of Steps S1 and S2, Steps T1 to T4, and Steps U1 and U2 illustrated in FIG. 6, according to the present embodiment, when a screen associated with the read communication mode (for example, the log-in screen) is displayed on the display unit 403 of the image forming device 3, it is possible to automatically set the communication mode of the portable terminal 7 to the read communication mode.

As has been discussed in the descriptions of Steps S11 and S12, Steps T11 to T14, and Steps U11 and U12 illustrated in FIG. 8, according to the present embodiment, when a screen associated with the two-way communication mode (for example, the device state screen) is displayed on the display unit 403 of the image forming device 3, it is possible to automatically set the communication mode of the portable terminal 7 to the two-way communication mode.

As described above, with the communication system 1 according to the present embodiment, when a screen associated with any of the plurality of communication modes is displayed on the display unit 403 of the image forming device 3, the portable terminal 7 can be automatically set to the communication mode associated with the screen. This makes it possible to omit the operation of setting the communication mode of the portable terminal 7, and thus helps achieve improved user friendliness.

In the above configuration, the plurality of communication modes include the read communication mode in which, with the portable terminal 7 serving as a contactless IC card or a contactless IC tag, the reader/writer 5 reads the card information or the tag information stored in the portable terminal 7. When a screen associated with the read communication mode is displayed on the display unit 403, the first communication control unit (the communication control unit 505) makes the first communication unit (the USB I/F unit 605) transmit the communication mode information indicating the read communication mode. When the second communication unit (the communication unit 51) has received the communication mode information indicating the read communication mode, the second communication control unit (the communication control unit 59) makes the third communication unit (the communication unit 53) transmit the request for communication in the read communication mode and sets the first mode-set unit (the mode-set unit 57) to the read communication mode. When the fourth communication unit (the communication unit 71) has received the request for communication in the read communication mode, the third communication control unit (the communication control unit 77) sets the second mode-set unit (the mode-set unit 75) to the read communication mode and performs control such that the portable terminal 7 communicates with the image forming device 3 via the reader/writer 5.

With this configuration, when a screen associated with the read communication mode (for example, the log-in screen) is displayed on the display unit 403 of the image forming device 3, the communication mode of the portable terminal 7 can be automatically set to the read communication mode.

In the above configuration, the plurality of communication modes include the two-way communication mode in which the reader/writer 5 and the portable terminal 7 perform two-way communication with each other. When a screen associated with the two-way communication mode is displayed on the display unit 403, the first communication control unit (the communication control unit 505) makes the first communication unit (the USB I/F unit 605) transmit the communication mode information indicating the two-way communication mode. When the second communication unit (the communication unit 51) has received the communication mode information indicating the two-way communication mode, the second communication control unit (the communication control unit 59) makes the third communication unit (the communication unit 53) transmit the request for communication in the two-way communication mode and sets the first mode-set unit (the mode-set unit 57) to the two-way communication mode. When the fourth communication unit (the communication unit 71) has received the request for communication in the two-way communication mode, the third communication control unit (the communication control unit 77) sets the second mode-set unit (the mode-set unit 75) to the two-way communication mode and performs control such that the portable terminal 7 communicates with the image forming device 3 via the reader/writer 5.

With this configuration, when a screen associated with the two-way communication mode (for example, the device state screen indicating the amount of remaining toner, the sheet, and the like) is displayed on the display unit 403 of the image forming device 3, the communication mode of the portable terminal 7 can be automatically set to the two-way communication mode.

In the above configuration, while a screen associated with none of the plurality of communication modes is being displayed on the display unit 403, the first communication control unit (the communication control unit 505) blocks the communication between the image forming device 3 and the reader/writer 5.

This configuration makes it possible to prevent unauthorized access to a screen associated with none of the plurality of communication modes from the portable terminal 7.

As described above, the communication method according to the present disclosure is one applied to the communication system 1 which includes the image forming device 3, the reader/writer 5, and the portable terminal 7, and in which the reader/writer 5 and the portable terminal 7 perform short-range wireless communication with each other by selecting any of the plurality of communication modes. Further, the communication method is characterized in that a screen associated with any of the plurality of communication modes is displayed on the display unit 403 of the image forming device 3, the communication mode information indicating the communication mode associated with the screen is transmitted from the image forming device 3 to the reader/writer 5, the reader/writer 5, which has received the communication mode information, is made to transmit, to the portable terminal 7, a request for communication in the communication mode associated with the screen, and the portable terminal 7, which has received the request, is set to the communication mode associated with the screen and made to communicate with the image forming device 3 in the communication mode.

With this communication method, when a screen associated with any of the plurality of communication modes is displayed on the display unit 403 of the image forming device 3, the portable terminal 7 can be automatically set to the communication mode associated with the screen to make the portable terminal 7 and the image forming device 3 communicate with each other.

Thus, according to the present embodiment, when a screen associated with any of the plurality of communication modes is displayed on the display unit 403 of the image forming device 3, the portable terminal 7 can be automatically set to the communication mode associated with the screen. This makes it possible to omit the operation of setting the communication mode of the portable terminal 7, and thus helps achieve improved user friendliness.

Of the communication system 1 according to the present embodiment, there are one aspect in which both the first example and the second example can be executed, another aspect in which the first example can be executed but the second example cannot be executed, and the other aspect in which the first example cannot be executed but the second example can be executed. In the aspect in which the first example cannot be executed but the second example can be executed, the authentication of the user of the image forming device 3 may be performed by using a contactless IC card storing card information therein or a contactless IC tag storing tag information therein, instead of using the portable terminal 7.

The following configuration may be added to the present embodiment. As illustrated in FIG. 2, in the image forming device 3, while a screen associated with none of the plurality of communication modes is being displayed on the display unit, the communication control unit 505 blocks the communication between the image forming device 3 and the reader/writer 5. With this configuration, it is possible to prevent unauthorized access from the portable terminal 7 to the screen associated with none of the plurality of communication modes.

The invention claimed is:

1. A communication system comprising:
an image forming device,
a reader/writer, and
a portable terminal,
the reader/writer and the portable terminal performing short-range wireless communication with each other by selecting any of a plurality of communication modes, wherein
the image forming device includes
a display unit,
a first communication unit used for communication with the reader/writer, and
a first communication control unit which, when a screen associated with any of the plurality of communication modes is displayed on the display unit, makes the first communication unit transmit communication mode information indicating a communication mode associated with the screen,
the reader/writer includes
a second communication unit used for communication with the image forming device,
a third communication unit used for communication with the portable terminal,
a first mode-set unit which is set to any of the plurality of communication modes, and
a second communication control unit
which performs control such that the reader/writer communicates with the portable terminal by using the third communication unit, in a communication mode to which the first mode-set unit has been set, and
which, when the second communication unit has received the communication mode information, makes the third communication unit transmit a request for communication in the communication mode associated with the screen and sets the first mode-set unit to the communication mode associated with the screen,
the portable terminal includes
a fourth communication unit used for communication with the reader/writer,
a second mode-set unit which is set to any of the plurality of communication modes,
a third communication control unit
which performs control such that the portable terminal communicates with the reader/writer by using the fourth communication unit, in the communication mode to which the second mode-set unit has been set, and
which, when the fourth communication unit has received the request, sets the second mode-set unit to the communication mode associated with the screen and performs control such that the portable terminal communicates with the image forming device via the reader/writer,
the screen includes a log-in screen, a device state screen, a network setting screen, a firmware version screen, and a copy setting screen, and communication mode information indicating a communication mode associated with any of the log-in screen, the device state screen, the network setting screen, the firmware version screen, and the copy setting screen is transmitted,
the plurality of communication modes include a read communication mode in which, with the portable terminal serving as a contactless IC card or a contactless IC tag, the reader/writer reads card information or tag information stored in the portable terminal, and a two-way communication mode in which the reader/writer and the portable terminal perform two-way communication with each other,
in a case where a screen associated with the read communication mode is displayed on the display unit,
the first communication control unit makes the first communication unit transmit the communication mode information indicating the read communication mode,
when the second communication unit has received the communication mode information indicating the read communication mode, the second communication control unit makes the third communication unit transmit the request for communication in the read communication mode and sets the first mode-set unit to the read communication mode, and
when the fourth communication unit has received the request for communication in the read communication mode, the third communication control unit sets the second mode-set unit to the read communication mode and performs control such that the portable terminal communicates with the image forming device via the reader/writer, and
in a case where a screen associated with the two-way communication mode is displayed on the display unit,
the first communication control unit makes the first communication unit transmit the communication mode information indicating the two-way communication mode,
when the second communication unit has received the communication mode information indicating the two-way communication mode, the second communication control unit makes the third communication unit transmit the request for communication in the two-way communication mode and sets the first mode-set unit to the two-way communication mode, and
when the fourth communication unit has received the request for communication in the two-way communication mode, the third communication control unit sets the second mode-set unit to the two-way communication mode and performs control such that the portable terminal communicates with the image forming device via the reader/writer.

2. The communication system according to claim 1, wherein
the first communication control unit blocks communication between the image forming device and the reader/writer while a screen associated with none of the plurality of communication modes is being displayed on the display unit.

3. A communication method applied to a communication system which includes an image forming device, a reader/writer, and a portable terminal, and in which the reader/writer and the portable terminal perform short-range wireless communication with each other by selecting any of a plurality of communication modes, the communication method comprising:

displaying a screen associated with any of the plurality of communication modes on a display unit of the image forming device and making the image forming device transmit communication mode information indicating a communication mode associated with the screen to the reader/writer;

making the reader/writer, which has received the communication mode information, transmit to the portable terminal a request for communication in the communication mode associated with the screen;

setting the portable terminal, which has received the request, to the communication mode associated with the screen; and making the portable terminal and the image forming device communicate with each other in the communication mode, wherein the screen includes a log-in screen, a device state screen, a network setting screen, a firmware version screen, and a copy setting screen, and communication mode information indicating a communication mode associated with any of the log-in screen, the device state screen, the network setting screen, the firmware version screen, and the copy setting screen is transmitted, the plurality of communication modes include a read communication mode in which, with the portable terminal serving as a contactless IC card or a contactless IC tag, the reader/writer reads card information or tag information stored in the portable terminal, and a two-way communication mode in which the reader/writer and the portable terminal perform two-way communication with each other, in a case where a screen associated with the read communication mode is displayed on the display unit, the communication mode information indicating the read communication mode is transmitted from the image forming device to the reader/writer, the request for communication in the read communication mode is transmitted from the reader/writer to the portable terminal, the portable terminal is set to the read communication mode, and the mobile terminal and the image forming device are made to communicate with each other via the read communication mode, and in a case where a screen associated with the two-way communication mode is displayed on the display unit, the communication mode information indicating the two-way communication mode is transmitted from the image forming device to the reader/writer, the request for communication in the two-way communication mode is transmitted from the reader/writer to the portable terminal, the portable terminal is set to the two-way communication mode, and the mobile terminal and the image forming device are made to communicate with each other via the two-way communication mode.

\* \* \* \* \*